United States Patent Office 3,752,787
Patented Aug. 14, 1973

3,752,787
FLUOROELASTOMER COMPOSITION CONTAINING A TRIARYLPHOSPHORANE VULCANIZATION ACCELERATOR
Marjorie Ruth de Brunner, Wilmington, Del., assignor to E. I. du Pont de Nemours and Company, Wilmington, Del.
No Drawing. Continuation-in-part of application Ser. No. 128,184, Mar. 25, 1971, which is a continuation-in-part of application Ser. No. 44,884, June 9, 1970, both now abandoned. This application Jan. 28, 1972, Ser. No. 221,785
Int. Cl. C08f 15/08, 45/04
U.S. Cl. 260—41 B           19 Claims

ABSTRACT OF THE DISCLOSURE

A fluoroelastomer composition which has beneficial utility in the manufacture of cured fluoroelastomer articles having good resistance to compression set can be prepared by blending the following components: (A) an elastomeric copolymer of vinylidene fluoride and another fluorinated monomer; and (B) a vulcanization accelerator comprised of a triarylphosphorane compound [for example, (carbethoxyethylidene) - triphenylphosphorane], which is used either alone or in combination with a certain quaternary ammonium compound or a certain guanidine or amidine compound; and when making the cured articles, it is also preferred to add (C) a suitable metal compound such as a divalent metal oxide or hydroxide and optionally a metal salt of a weak acid; and (D) a cross-linking agent composed of a suitable polyhydroxylic-aromatic compound, for example, hexafluoroisopropylidene-bis(4-hydroxybenzene).

CROSS-REFERENCE TO RELATED APPLICATIONS

This is a continuation-in-part of patent application Ser. No. 128,184 filed on Mar. 25, 1971 now abandoned; Ser. No. 128,184, was continuation-in-part of patent application Ser. No. 44,884 filed on June 9, 1970 now abandoned.

BACKGROUND OF THE INVENTION

This invention concerns a useful fluoroelastomer composition and a process for curing a fluoroelastomer composition.

Highly fluorinated elastomers have found increasing application in specialized areas, such as high temperature resistant gaskets, seals, diaphragms, and tubing. Fabricated fluoroelastomer articles can withstand temperatures of about 250–350° C. while retaining their good elasticity.

It is necessary for many applications, for example, gaskets for high-temperature reactors, that the fluoroelastomer article be resilient and have low compression set. This is accomplished by curing the article; that is, by vulcanizing or cross-linking the elastomer.

Prior art processes for vulcanization of fluoroelastomers use mainly aliphatic diamines as cross-linking agents, or they carry out free radical-initiated vulcanization in the presence of organic peroxides or high energy radiation. The diamines generally are to scorchy for practical application, and more recently they have been replaced by carbamates or aminocarbamic acids. Organic peroxides tend to provide fast gelation, and compounded stocks consequently do not have the required processing safety. High energy radiation is a slow process which does not always lead to a fully cured material. In addition, this process is quite expensive. There is a need, therefore, for a fluoroelastomer vulcanization process which combines satisfactory cure rates with good processing safety and good storage stability of unvulcanized formulations; and which yields vulcanized polymers of good stress/strain properties and a low compression set.

SUMMARY OF THE INVENTION

Expressed broadly, the present invention provides a useful fluoroelastomer composition comprising (A) an elastomeric copolymer of vinylidene fluoride and at least one other fluorinated monomer, and
(B) as a vulcanization accelerator, a triarylphosphorane compound.

The invention also provides a process which comprises providing a mixture comprised of components A and B as described in the preceding paragraph and curing the resulting mixture; preferably a suitable metal compound and cross-linking agent are added to the mixture prior to the curing operation.

DESCRIPTION OF PREFERRED EMBODIMENTS

The composition composed of components A and B is a useful article of commerce which (as in the case of a novel polymer) can be supplied to manufacturers of fabricated fluoroelastomer articles who wish to modify the material (e.g. with certain metal compounds and cross-linking agents) according to the requirements of particular end products before they carry out the curing operation. Another useful approach is for the supplier of the fluoroelastomer composition to add one or both of the following components before the composition is delivered to the person who makes the cured articles:

(Component C) a metal compound selected from the group consisting of divalent metal oxides, divalent metal hydroxides, and mixtures of such oxides or hydroxides with metal salts of weak acids.
(Component D) a polyhydroxyl aromatic compound cross-linking agent for the copolymer.

In the majority of applications, the curable composition used by the person who makes the cured articles preferably contains, for each 100 parts by weight of the component A copolymer, about 1–15 parts by weight of the component C metal compound, about 0.1–5.0 parts by weight of the component D polyhydroxylic compound and about 0.2–10.0 parts by weight of vulcanization accelerator; especially preferred is a component C content of about 2–10 parts, a component D content of about 0.6–2 parts, and an accelerator content of about 0.5–2.0 parts per 100 parts of copolymer.

The component A elastomeric copolymer is preferably a copolymer of vinylidene fluoride and hexafluoropropylene, a copolymer of vinylidene fluoride and chlorotrifluoroethylene, a terpolymer of vinylidene fluoride, hexafluoropropylene, and tetrafluoroethylene, or a blend of two or more such copolymers. Especially preferred are vinylidene fluoride/hexafluoropropylene copolymers in which the monomers are combined in a mole ratio of about 85:15 to 50:50. Component A can also be any other vinylidene fluoride copolymer fluoroelastomer which can be cured to useful products, for example copolymers of vinylidene fluoride with dichlorodifluoroethylene or chlorofluoroethylene, with fluorinated vinyl esters, with derivatives of perfluoroacrylic acid, and with fluorinated alkyl vinyl ethers; the latter can be illustrated by copolymers of vinylidene fluoride and a perfluoroalkyl perfluorovinyl ether as described in U.S. Pat. 3,136,745, and terpolymers of vinylidene fluoride, tetrafluoroethylene and said ether as described in U.S. Pat. 3,235,537. Also useful are copolymers of vinylidene fluoride and 1,2,3,3,3-pentafluoropropylene (e.g. as described in U.S. Pat. 3,331,823), and terpolymers of these two components with tetrafluoroethylene (e.g. as described in U.S. Pat. 3,335,106). The "other fluorinated monomer" of component A is preferably an ethylenically unsaturated monomer containing at least as many fluorine atoms as carbon atoms.

Component C of the novel composition is a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for example, a mixture containing about 1–70% by weight of the metal salt. Among the useful metal salts of weak acids are barium-, sodium-, potassium-, lead-, and calcium-/-stearate, -benzoate, -carbonate, -oxalate, and -phosphite. The amount of the metal compound added generally is about 1–15 parts by weight per 100 parts of fluoroelastomer, about 2–6 parts being preferred. The metal compound concentration to some extent affects the rate of cure and below the preferred range the cure rate may sometimes be unduly decreased. Above the preferred range, the elastic properties of a cured fluoroelastomer are gradually impaired and it is therefore advantageous not to use too large amounts of the metal compound.

The metal compound serves a dual purpose. It absorbs certain gaseous and acidic materials which are evolved during vulcanization and can chemically attack and weaken the fluoroelastomer. It also provides a long-term aging stability. When using a metal oxide, it can be compounded with a fluoroelastomer stock either free or as a metal oxide complex or chelate with organic complexing agents and ligands, such as cyclic polyethers, amines, phosphines, ketones, alcohols, phenols, or carboxylic acids.

As component D of the preferred curable composition, one can use any known polyhydroxylic aromatic compound capable of functioning as a cross-linking agent for the elastomeric copolymer. For example, the component D cross-linking agent can be any one of the following: di-, tri-, and tetrahydroxybenzenes, naphthalenes, and anthracenes, and bisphenols of the formula

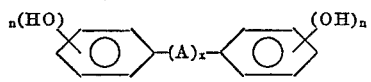

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the polyhydroxylic compound is optionally substituted with at least one atom of chlorine, fluorine, or bromine, or a carboxyl or acyl radical (e.g. a —COR where R is H or a $C_1$–$C_8$ alkyl, aryl, or cycloalkyl group). It will be understood from the above bisphenol formula that the —OH groups can be attached in any position (other than number one) in either ring. Blends of two or more such compounds can also be used. One of the most useful cross-linking agents is the bisphenol compound known as Bisphenol AF, which is hexafluoroisopropylidene-bis(4-hydroxybenzene). The compounds 4,4' - dihydroxydiphenyl sulfone (Bisphenol S) and isopropylidene-bis(4-hydroxybenzene) or Bisphenol A are also considered as very useful bisphenols. Another very useful cross-linking agent is hydroquinone. Others are illustrated by such dihydroxybenzenes as catechol, resorcinol, 2-methyl resorcinol, 5-methyl resorcinol, 2-methyl hydroquinone, 2,5-dimethyl hydroquinone, and 2-t-butyl hydroquinone; also included are such compounds as 1,5-dihydroxynaphthalene and 9,10-dihydroxyanthracene. Others are illustrated as follows:

1,4,9,10-tetrahydroxyanthracene;
2,2',4,4'-tetrahydroxybenzophenone;
2,4-dihydroxybenzophenone;
2,4-dihydroxybenzoic acid;
4,4'-dihydroxytetraphenylmethane;
2,6-dihydroxyanthraquinone;
3,6-dihydroxyxanthone;
pyromellitic-bis-(p-hydroxyphenylimide);
2,4-dihydroxyacetophenone;
4,4'-dihydroxybenzophenone;
4,4'-dihydroxydiphenyl sulfoxide;
2,4-dibenzoylresorcinol;
2,4,5-trihydroxybutyrophenone;
2,4-dihydroxybenzaldehyde.

When changing from one cross-linking agent to another in a given composition, one skilled in the art will be able to select a curing time and temperature that will give a suitable rate of cure for a particular application.

Referring to the bisphenol formula shown above, when A is alkylene, it can be for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl - 1,2 - propylene, pentamethylene, pentachloropentamethylene, pentafluoropentamethylene, and hexamethylene. When A is alkylidene, it can be, for example, ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example, 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Furthermore, A can be an arylene radical such as m-phenylene, p-phenylene, 2,-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene.

Useful curable compositions can be made by replacing all or part of component D with one or more other compounds known to be capable of functioning as a cross-linking agent for the component A copolymer. Known, but not preferred, cross-linking means are mentioned above in the "Background of the Invention."

An essential ingredient of the novel composition is the component B accelerator.

Cross-linking of highly fluorinated polymers with aromatic polyhydroxylic compounds must be carried out in the presence of a catalyst. Catalysts which accelerate vulcanization or curing of elastomers are generally referred to as "vulcanization accelerators." According to this invention, it is an important feature of the process to employ a triaryl phosphorane compound as a vulcanization accelerator. It is quite unexpected that this compound functions so effectively as a vulcanization accelerator for a fluoroelastomer in the presence of the other ingredients of the composition.

As used herein, the expression "triaryl phosphorane compound" means a compound which contains the triaryl phosphoranylidene group, said group having the formula $Ar_3P=$; both of the non-designated bonds of this group are attached to a single carbon atom. $Ar_3$ means there are three aryl groups attached to the phosphorous atom. The three aryl groups can be phenyl; also part or all of the phenyl groups can be replaced with substituted phenyl groups and other known aryl groups, for example tolyl, xylyl, naphthyl, chlorophenyl, methoxyphenyl and the like.

There is a discussion of triaryl phosphoranes, including the nomenclature and preparation thereof, in "Ylid Chemistry" by A. W. Johnson, Academic Press, New York, N.Y. (1966). In the practice of the present invention, one will of course usually prefer to use a triaryl phosphorane which will not undergo any harmful reaction with components of the atmosphere during normal storage and mixing procedures. However, if one wishes to use a triaryl phosphorane which tends to be harmfully oxidized or hydrolyzed by the atmosphere, the compound can be protected during preparation and storage of the curable fluoroelastomer composition by using nitrogen or other suitable known inert media to avoid any undue exposure of the material to the atmosphere.

The component B accelerator is preferably a compound of the formula

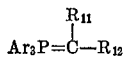

wherein $Ar_3$ is triaryl, and $R_{11}$ and $R_{12}$ are selected from the group: (I) separate groups selected individually from (a) hydrogen, methyl, ethyl, propyl, and carbalkoxy ($C_1$–$C_6$ alkyl) in the case of $R_{11}$, and (b) carbalkoxy ($C_1$–$C_6$ alkyl), —CN and —$CONH_2$ in the case of $R_{12}$; and (II) a single group which together with the carbon atom to which the single group is attached forms a cyclic group selected from:

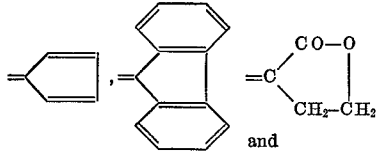

A particularly preferred accelerator is composed of (carbethoxyethylidene)-triphenylphosphorane, or a blend thereof with about 1–50% of another triaryl phosphorane compound (e.g., within the above preferred formula), based on the total weight of accelerator. The compound in the previous sentence can also be called ethyl 2-(triphenylphosphoranylidene)-propionate. Other preferred component B accelerators are illustrated as follows: 2-(triphenylphosphoranylidene) - gamma - butyrolactone, (carboxamidomethylene) - triphenylphosphorane, and (carbethoxymethylene) - triphenylphosphorane. The first compound of the previous sentence can also be called 2-(triphenylphosphoranylidene) - 4 - hydroxybutyric acid lactone; the second can also be called (triphenylphosphoranylidene)-acetic acid amide; the third can also be called ethyl(triphenylphosphoranylidene)-acetate. Other useful compounds include (9-fluorenylidene)-triphenylphosphorane;
ethyl 2-(triphenylphosphoranylidene)-butyrate;
ethyl 2-(triphenylphosphoranylidene)-pentanoate; and
(triphenylphosphoranylidene)-acetic acid nitrile.

Among the known methods for preparing triarylphosphorane compounds are those disclosed in U.S. Pat. 2,912,467 and German Pat. 943,648.

Before component B is blended with the other ingredients of the composition, it is often desirable to combine it (e.g. by mixing in a mortar and pestle) with fine particles of a solid material that undergoes no harmful reaction with component B or with any of the other ingredients. For example, it can be combined in adsorbed or absorbed relationship with finely divided calcium carbonate, calcium silicate, silica or the like to form composite accelerator particles.

Compositions of this invention can contain component B as the sole accelerator, or they can contain blends of component B with one or more compounds already known to be capable of functioning as vulcanization accelerator for the component A copolymer.

Components B, C and D can be mixed with the elastomeric copolymer and any other ingredients to be added by means of any mixing apparatus known to be useful for preparing rubber compositions, for example a roller-type rubber mill or a Banbury mixer. Known fillers, pigments, pore-forming agents and other additives can also be blended with the composition.

In a preferred embodiment of the present composition, the vulcanization accelerator is comprised of a blend of component B (as described above) and component E (a certain quaternary ammonium compound as described below) and/or component F (a compound as described below which is selected from a certain class of guanidine and amidine compounds).

Component E is a quaternary ammonium compound having a formula selected from the group consisting of

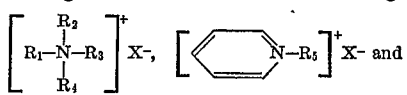

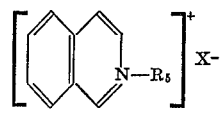

wherein $R_1$, $R_2$, $R_3$ and $R_4$ are selected individually from the group consisting of $C_1$–$C_{20}$ alkyl, fluoroalkyl, aralkyl, polyoxyalkylene and polyoxyfluoroalkylene, at least two members of said group being alkyl or aralkyl; $R_5$ is $C_1$–$C_{20}$ alkyl; and X is selected from the group consisting of hydroxide, halide, sulfate, sulfite, carbonate, pentachlorothiophenolate, tetrafluoroborate, hexafluorosilicate, hexafluorophosphate, dimethyl phosphate, and $C_1$–$C_{20}$ alkyl-, aralkyl-, and aryl-/-carboxylate and -dicarboxylate. The component E compound is described in further detail in copending U.S. patent application Ser. No. 39,150, filed May 20, by D. B. Pattison.

Component F is a compound selected from the group:

(a) a guanidine of the formula

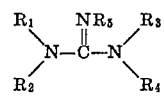

where each of $R_1$, $R_2$, $R_3$, $R_4$ and $R_5$ can independently be an alkyl, cycloalkyl, aralkyl, or aryl radical of 1–20 carbon atoms, with a proviso that no more than two aromatic radicals can be present; and with a further proviso that any two radicals can be joined to form a ring structure;

(b) a salt of a guanidine described in paragraph (a) with an organic or inorganic acid; and (c) an amidine of the formula

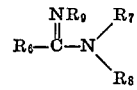

where each of $R_6$, $R_7$, $R_8$, and $R_9$ can independently be an alkyl, cycloalkyl, or aralkyl radical of 1–20 carbon atoms; and any two radicals can be joined to form a ring structure.

The component F compound is described in further detail in copending U.S. Patent application Ser. No. 32,720, filed Apr. 28, 1970 by J. M. Bowman.

The weight ratio of Component B to Component E (or Component F or a mixture of E and F) when using a composite accelerator composed of a blend of these ingredients is preferably about 5:95 to 95:5, and still more preferably about 25:75 to 75:25. A particular preferred Component E compound is methyltrioctyl ammonium chloride; and a particularly preferred Component F compound is 2-dodecyl-1,1,3,3-tetramethylguanidine.

In preparing different compositions of the invention for different purposes and from different ingredients, one skilled in the art will realize the need to increase the Component B content of the composition as he reduces the amount of Components E and F, increases the amount of carbon black, or replaces a highly reactive elastomer or accelerator with a less reactive one.

The initial curing of the curable composition is preferably carried out by heating the composition for about 3–30 minutes at about 149–204° C.; conventional rubber-curing presses, molds, extruders and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 204–260° C. One skilled in the art will realize that the best curing time and temperature for a particular application will depend on such factors as the nature and proportion of ingredients and the properties needed in the final product.

The exact nature is not yet known of the chemical reaction involving the accelerator during curing of the present composition, and the accelerator reaction products present in the cured material.

The mixture of Components A and B, and preferably also of Components C and D, can be mixed with a solvent for Component A to form a liquid composition useful in the preparation of adhesive layers, coatings, films, and the like. Among the preferred solvents are acetone, methylethyl ketone, ethyl acetate, amyl acetate, and tetrahydrofuran.

The novel composition has beneficial utility in the manufacture of cured fluoroelastomer articles having low compression set; it is very useful for the production of heat-resistant, resilient O-ring seals, shaft seals, gaskets, tubing and the like. The invention can be employed to manufacture such articles while achieving the additional advantages of rapid cure, improved storage stability (especially when the uncured composition must be exposed to warm humid air), better flow properties resulting from the absence of premature gelation, and satisfactory stress/strain properties. Also, curable compositions can be prepared according to the present invention which are more useful than those made with certain prior art accelerators for the following two reasons: (1) The amount of Component B accelerator added to the present composition does not have to be regulated with a level of accuracy that is difficult to maintain under ordinary manufacturing conditions (e.g., a cured product having good compression set and other properties can be obtained despite the inadvertent addition of a little more than the intended or optimum amount of the accelerator); and (2) The preferred compositions, especially those containing a preferred crosslinking agent such as hexafluoroisopropylidene-bis(4-hydroxybenzene), have superior resistance to a premature curing reaction during the mixing and other stages of preparing the composition for molding and curing.

Example 1

This example, and the others which follow, are given for the purpose of illustrating the invention. All quantities shown are on a weight basis unless otherwise indicated. A useful, curable fluoroelastomer composition of the present invention is prepared, cured, and tested. The formula and test results are shown below in Table I. The vulcanization accelerator in this composition is composed of a blend of a type B compound (triarylphosphorane) and a type F compound (guanidine) as described above. The type B accelerator compound is carbethoxyethylidene-triphenylphosphorane. The type F accelerator ("other" accelerator) is DDTG (2-dodecyl-1,1,3,3-tetramethylguanidine) absorbed on silica (Silene D), the weight ratio of the DDTG to silica being about 25:75.

The fluoroelastomer is a vinylidene fluoride/hexafluoropropylene 60:40 copolymer whose Mooney viscosity (ML-10 at 100° C.) is 60. The type of carbon black is Thermax MT. The composition is prepared by blending the ingredients on a 2-roll mill whose rolls are at about 25° C.

In the ODR Cure Test, which indicates the rate of cure, an oscillating disc rheometer is used at about 168° C. in a process which comprises oscillating a grooved biconical disc through an arc while pressed tightly between two pieces of the sample to measure relative viscosity, and, at certain intervals as the curing proceeds (the curing time in minutes shown in the left column), reporting the amount of torque (inch-pound readings in the numbered example columns) required to oscillate the disc as a measure of viscosity. This general type of test is described by Decker, Wise and Guerry in Rubber World, December 1962, page 68. One can use the resulting data to prepare curing curves by plotting viscosity values against time; the rate of cure is indicated by the slope of the curve at its steepest point.

As shown in Table I, a maximum viscosity of 124 is obtained in the 30 minute test; and it can be seen that the viscosity is about 95% of maximum in only 5 minutes, and almost at 100% of maximum in 10 minutes. The very rapid cure of the composition is quite unexpected; also, it is an important advantage in many commercial applications. In the Press/Heat Cycle, the samples are press-cured for 15 minutes at about 168° C.; then they are post-cured in an oven at about 232° C. for 24 hours after the samples and the oven are gradually heated from 25° C. to 232° C. during a period of 4 hours. A total pressure of about 40,000 pounds is used in making the press-cured samples. Post-curing is done in an oven in which a blower circulates the air. The modulus, tensile and elongation values are obtained at room temperature by ASTM Method D-412-66.

When a composition outside the invention is prepared by repeating Example 1 except the type B accelerator is omitted, the curing rate is considerably slower. This composition, in which the type F accelerator is the only one present, is typical of a class of compositions in recent use in the industry. In the 30 minute ODR Cure Test, a maximum viscosity of 92.3 is obtained; and the viscosity is only at about 21% of maximum in 5 minutes, and at about 85% of maximum in 10 minutes.

Example 2

A composition of the invention having similar utility to the composition of Example 1 is prepared by repeating Example 1 except the type B accelerator of Example 2 is composed of 0.35 part of (carbethoxymethylene)-triphenylphosphorane. In the 30 minute ODR Cure Test as shown in Table I, a maximum viscosity of 99 is obtained, and the viscosity is at about 78% of maximum in 5 minutes and at about 98% of maximum in 10 minutes.

Example 3

Another fast-curing composition of the invention is prepared by repeating Example 1 except the type B accelerator is composed of 0.35 part of 2-(triphenylphosphoranylidene)-gamma-butyrolactone, and the type F compound is replaced with a type E compound as described above (quaternary ammonium compound). The "other" accelerator (type E accelerator) is MTAC (methyltrioctyl ammonium chloride) absorbed on silica, the weight ratio of the MTAC to silica being about 33:67. It can be seen from Table I that the viscosity is at about 94% of the 30 minute maximum in only 5 minutes, and over 98% of maximum in 10 minutes.

When a composition outside the invention is prepared by repeating Example 3 except the type B accelerator is omitted, the curing rate is much lower. The viscosity is only at about 6.5% of the 30 minute maximum in 5 minutes, and at about 70% of maximum in 10 minutes.

TABLE I

| Composition | Example 1 | Example 2 | Example 3 |
|---|---|---|---|
| Fluoroelastomer | 100 | 100 | 100 |
| Magnesia (Maglite® D) | 3 | 3 | 3 |
| Calcium hydroxide | 6 | 6 | 6 |
| Carbon black | 30 | 30 | 30 |
| Hydroquinone | 1 | 1 | 1 |
| Type B accelerator | 0.36 | 0.35 | 0.35 |
| Other accelerator | 1.0 | 1.0 | 1.0 |
| ODR cure test: | | | |
| 2.5 | 49.3 | 5.0 | 8.3 |
| 3 | | 9.3 | 31.5 |
| 5 | 118.0 | 76.9 | 93.2 |
| 7.5 | 122.4 | | 96.7 |
| 10 | 123.4 | 96.8 | 97.8 |
| 20 | 124 | 99 | 99.2 |
| 30 | 124 | 99 | 99.2 |
| After press/heat cycle: | | | |
| Modulus, 100%, p.s.i. | 1,350 | 1,200 | 1,200 |
| Tensile strength, p.s.i. | 1,600 | 1,700 | 1,750 |
| Elongation at break, percent | 115 | 125 | 135 |

Example 4

A composition of the invention which is especially useful in applications requiring superior resistance to compression set is prepared by repeating Example 1 except: the hydroquinone is replaced with 2.4 parts of hexafluoroisopropylidene-bis(4-hydroxybenzene), which can be referred to as Bisphenol AF; the type F accelerator is omitted; and the amount of type B accelerator is increased. Test results are shown in Table II. Compression set test-1 values are obtained by ASTM D-395-61 Method B, using one inch by 0.139 inch O-rings as test samples, and conducting the test at about 204° C. for 70 hours. Compression set test-1A values are obtained in the same manner except the time is 336 hours. The composition has good resistance to premature gelation.

A useful composition of this invention is also obtained when only the fluoroelastomer and accelerator components of Example 4 are mixed in the proportions used in that example. As mentioned previously, the resulting 2-component mixture can later be blended with various additives (e.g. the other ingredients of Example 4) before the composition is made into cured end products. A 3-component composition in which the Example 4 metal compound of polyhydroxylic compound is blended with the 2-component mixture in the proportions shown is also a useful article of commerce which can be stored, shipped, and later blended with certain additives before it is made into cured end-products.

Example 4A

A composition outside the invention is prepared by repeating Example 4 except the type B accelerator is replaced with one part of the type F accelerator used in Example 1 (DDTG on silica). This compoistion is typical of a class of compositions in recent use in the industry. Test results are shown in Table II.

Example 5

Another composition of the invention which is very resistant to compression set is prepared by repeating Example 4 except the formula is as shown in Table II; the accelerator is (carboxamidomethylene)-triphenylphosphorane; and the press-cure time in 30 minutes.

EXAMPLE 5A

A useful composition is also prepared and tested by repeating Example 4 except: the formula is as shown in Table II; the bisphenol is 4,4'-dihydroxy diphenyl sulfone (Bisphenol S); the ODR Test is at about 193° C.; in the Press/Heat Cycle, the samples are press-cured for 10 minutes at about 193° C., then post-cured at about 260° C. for 24 hours. In the ODR Cure Test, the torque value is 9.5 in 2.5 minutes and 43 in 5 minutes.

TABLE II

| Composition | Example | | | |
|---|---|---|---|---|
| | 4 | 4A | 5 | 5A |
| Fluoroelastomer | 100 | 100 | 100 | 100 |
| Magnesia (Maglite® D) | 3 | 3 | 3 | 3 |
| Calcium hydroxide | 6 | 6 | 6 | 6 |
| Carbon black | 30 | 30 | 30 | 30 |
| Bisphenol | 2.4 | 2.4 | 3.0 | 2.0 |
| Type B accelerator | 0.72 | | 1.0 | 1.5 |
| Type F accelerator | | 1.0 | | |
| ODR cure test: | | | | |
| 10 | 14 | 4.3 | 7.2 | 75 |
| 15 | 48 | 53 | 22 | |
| 20 | 95 | 115 | 39 | 83 |
| 25 | 111 | 118 | 53 | |
| 30 | 115 | 118 | 62 | 85 |
| 60 | | | 81 | 88 |
| After press/heat cycle: | | | | |
| Modulus, 100%, p.s.i. | 950 | 1,100 | 1,600 | 1,200 |
| Tensile strength, p.s.i. | 1,650 | 1,550 | 2,050 | 1,700 |
| Elongation at break, percent | 155 | 130 | 130 | 150 |
| Compression set test-1 | 13 | 18 | | |
| Compression set test-1A | 26 | 40 | 30 | 38 |

Examples 6–10

Five other useful compositions of the invention are prepared as described below by repeating Example 4 except: In Example 6 the accelerator is composed of 0.7 part of 2-(triphenylphosphoranylidene)-gamma-butyrolactone. In Example 7 the accelerator is the same as in Example 6, and the Bisphenol AF is replaced with one part of hydroquinone. In Example 8 the amount of the Example 4 accelerator is 1.0 part and the Bisphenol AF is replaced with one part of hydroquinone. In Example 9 the amount of the Example 4 accelerator is 1.08 parts, the amount of Bisphenol AF is 3.0 parts, and the fluoroelastomer is a terpolymer of about 43 parts vinylidene fluoride, 39 parts hexafluoropropylene and 18 parts of tetrafluoroethylene, the terpolymer having a Mooney viscosity (ML-10 at 100° C.) of 65. In Example 10, the fluoroelastomer is the terepolymer described in Example 9; otherwise the composiiton is the same as in Example 4.

The compositions of Examples 9 and 10 are highly resistant to premature curing during the mixing and other stages of preparing the composition for molding and curing. Moreover, they have a characteristic which illustrates another beneficial result obtainable with compositions of this invention: When subjected to molding and curing conditions, they undergo rapid cure after a certain time lapse. By regulating the amount of accelerator and crosslinking agent present, one can provide compositions having a specific predetermined time lapse in the curing operation before rapid curing takes place. In the ODR Cure Test, the Example 9 composition starts to cure very rapidly after about 10 minutes; and the Example 10 composition starts to cure rapidly after about 20 minutes.

I claim:
1. A fluoroelastomer composition comprising
   (A) an elastomeric copolymer of vinylidene fluoride and at least one other fluorinated monomer, and
   (B) as a vulcanization accelerator, a triarylphosphorane compound.
2. A composition according to claim 1 wherein component B is a compound of the formula

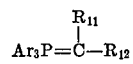

$$Ar_3P=C-R_{12}$$
$$\overset{R_{11}}{|}$$

wherein $Ar_3$ is triaryl, and $R_{11}$ and $R_{12}$ are selected from the group: (I) separate groups selected individually from (a) hydrogen, methyl, ethyl, propyl, and carbalkoxy ($C_1$-$C_6$ alkyl) in the case of $R_{11}$, and (b) carbalkoxy ($C_1$-$C_6$ alkyl), —CN and —CONH$_2$ in the case of $R_{12}$; and (II) a single group which together with the carbon atom to which the single group is attached forms a cyclic group selected from:

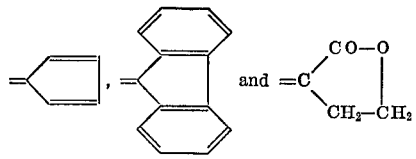

3. A composition according to claim 1 which also contains
   (C) a metal compound selected from the group consisting of divalent metal oxides, divalent metal hydroxides, and mixtures of such oxides or hydroxides with metal salts of weak acids.
4. A composition according to claim 1 which also contains
   (D) a polyhydroxylic aromatic compound cross-linking agent for the copolymer.
5. A composition according to claim 1 which contains for each 100 parts by weight of component A, about 0.2–10.0 parts by weight of component B, and also contains about 1–15 parts by weight of component C as defined in claim 3 and about 0.1–5.0 parts by weight of component D as defined in claim 4.

6. A composition according to claim 5 wherein the component B content is about 0.5–2.0 parts by weight.

7. A composition according to claim 5 wherein component A is a copolymer selected from the group consisting of copolymers of vinylidene fluoride and hexafluoropropylene, copolymers of vinylidene fluoride and chlorotrifluoroethylene, and terpolymers of vinylidene fluoride, hexafluoropropylene, and tetrafluoroethylene.

8. A composition according to claim 7 wherein component D is a compound selected from the group consisting of di-, tri-, and tetrahydroxybenzenes, naphthalenes, and anthracenes, and bisphenols of the formula

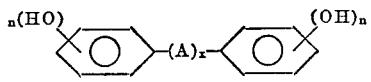

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the polyhydroxylic compound is optionally substituted with at least one atom of chlorine, fluorine, or bromine, or a carboxyl or acyl radical.

9. A composition according to claim 8 wherein component D is hydroquinone.

10. A composition according to claim 8 wherein component D is hexafluoroisopropylidene-bis(4-hydroxybenzene).

11. A composition according to claim 8 wherein component D is 4,4′-dihydroxydiphenyl sulfone.

12. A composition according to claim 7 wherein about 50–100% by weight of component B is composed of (carbethoxyethylidene)-triphenylphosphorane.

13. A composition according to claim 7 wherein about 50–100% by weight of component B is composed of 2-(triphenylphosphoranylidene)-gamma-butyrolactone.

14. A composition according to claim 7 wherein about 50–100% by weight of component B is composed of (carboxamidomethylene)triphenylphosphorane.

15. A composition according to claim 7 wherein about 50–100% by weight of component B is composed of (carbethoxymethylene)-triphenylphosphorane.

16. A composition according to claim 7 which contains as a vulcanization accelerator a blend of component B and: (E) a quaternary ammonium compound having a formula selected from the group consisting of

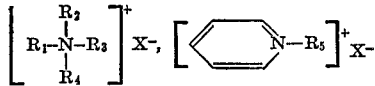

and

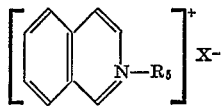

wherein $R_1$, $R_2$, $R_3$ and $R_4$ are selected individually from the group consisting of $C_1$–$C_{20}$ alkyl, fluoroalkyl, aralkyl, polyoxyalkylene and polyoxyfluoroalkylene, at least two members of said group being alkyl or aralkyl; $R_5$ is $C_1$–$C_{20}$ alkyl; and X is selected from the group consisting of hydroxide, halide, sulfate, sulfite, carbonate, pentachlorothiophenolate, tetrafluoroborate, hexafluorosilicate, hexafluorophosphate, dimethyl phosphate, and $C_1$–$C_{20}$ alkyl-, aralkyl-, and aryl-/-carboxylate and -dicarboxylate; the weight ratio of B:E being about 5:95 to 95:5.

17. A composition according to claim 16 wherein component E is methyltrioctyl ammonium chloride, and the weight ratio of B:E is about 25:75 to 75:25.

18. A composition according to claim 7 which contains as a vulcanization accelerator a blend of component B and; (F) a compound selected from the group:
(a) a guanidine of the formula

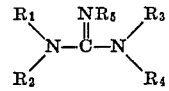

where each of $R_1$, $R_2$, $R_3$, $R_4$ and $R_5$ can independently be an alkyl, cycloalkyl, aralkyl, or aryl radical of 1–20 carbon atoms, with a proviso that no more than two aromatic radicals can be present; and with a further proviso that any two radicals can be joined to form a ring structure;
(b) a salt of a guanidine described in paragraph (a) with an organic or inorganic acid; and
(c) an amidine of the formula

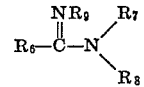

where each of $R_6$, $R_7$, $R_8$, and $R_9$ can independently be an alkyl, cycloalkyl, or aralkyl radical of 1–20 carbon atoms; and any two radicals can be joined to form a ring structure; the weight ratio of B:F being about 5:95 to 95:5.

19. A composition according to claim 18 wherein component F is 2-dodecyl-1,1,3,3-tetramethylguanidine, and the weight ratio of B:F is about 25:75 to 75:25.

References Cited
UNITED STATES PATENTS

| | | | |
|---|---|---|---|
| 3,524,836 | 8/1970 | Barney | 260—80.77 |
| 3,243,411 | 4/1966 | Tawney | 260—61 |
| 3,088,938 | 5/1963 | Cluff | 260—87.7 |

MORRIS LIEBMAN, Primary Examiner

R. ZAITLEN, Assistant Examiner

U.S. Cl. X.R.

260—606.5 F, 87.7